April 14, 1959     A. L. BOEGEHOLD     2,881,511
HIGHLY WEAR-RESISTANT SINTERED POWDERED METAL
Filed Aug. 14, 1956
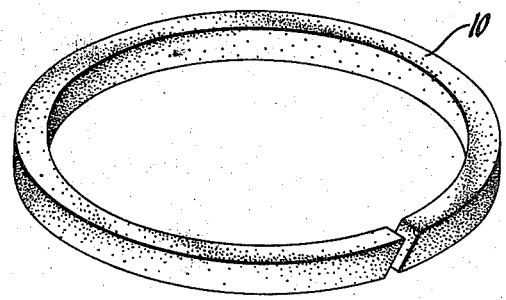
Inventor
Alfred L. Boegehold
By Willis, Helwig & Baillio
Attorneys

2,881,511

HIGHLY WEAR-RESISTANT SINTERED POWDERED METAL

Alfred L. Boegehold, Orchard Lake, Mich., assignor to General Motors Corporation, Detroit, Mich., a corporation of Delaware Application August 14, 1956, Serial No. 603,867

18 Claims. (Cl. 29—182)

This invention relates to sintered powdered metals containing nickel-titanium alloy particles particularly to such powdered metals having a high degree of wear resistance in either the sintered form or in the sintered and worked form. This application is a continuation-in-part of my co-pending patent applications Serial Nos. 317,361, now abandoned, and 317,737, now abandoned, which were filed on October 28, 1952, and October 30, 1952, respectively.

Porous metal bearing parts have been employed in industry during recent years, but their use in many applications has been limited because of their relatively low wear resistance. A principal object of the present invention, therefore, is to provide a novel sintered powdered metal having a high degree of wear resistance due to the presence of dispersed, hard particles of nickel-titanium alloy. A further object of this invention is to provide a simple and inexpensive process for forming wear-resistant sintered powdered metal articles containing such particles and having close dimensional tolerances.

It is also the purpose of my invention to produce specific articles having very high wear resistance. Hence the invention provides a sintered and worked powdered ferrous base metal piston ring having excellent score resistance as well as wear resistance because of the inclusion of the aforementioned hard nickel-titanium alloy particles. Also the expensive process of chromium plating piston rings can be eliminated without sacrificing hardness and wear properties. Engine tests on piston rings formed in accordance with my invention indicate that the wear resistance of these rings compares favorably with that of chromium plated rings. The invention likewise can be used to manufacture sintered powdered copper base and aluminum base bearings having outstanding wear resistance with or without subsequent hot or cold working or thermal treatment.

A piston ring or bearing formed in accordance with this invention has proper porosity and hence also possesses excellent self-lubricating properties. For example, when a piston provided with such a piston ring is stationary, oil is stored uniformly throughout the capillary structure of the ring. When the piston begins to reciprocate, oil is instantly sent to the surface from the inside pores in the ring, thus maintaining a constant oil film. Another feature of these powdered metal piston rings is their high resistance to the corrosion normally encountered when high solvent content gasolines are used in engines having low water jacket temperatures. Under similar conditions, conventional cast iron piston rings suffer relatively rapid attack.

Moreover, my sintered and worked powdered metal articles, when compared with cast wear-resistant parts, do not require expensive machining operations to provide the required tolerances. Since little or no machining is necessary, scrap or waste is reduced to a minimum. Such a wear-resistant sintered powdered metal may be used to form bearings and bearing surfaces, including camshaft thrust bearing plates, piston rings, tappets, gears, valve stem guides, piston pin bushings, camshaft bushings, balancer shaft bushings, etc. Hence the word "bearing," as used herein, is intended to include all such applications in which high wear resistance and good anti-score properties of the metal part are desirable.

The above and other objects are attained in accordance with the present invention by the inclusion of nickel-titanium alloy particles of proper composition in a powdered metal mix. The resultant product, when sintered, or when sintered and worked to a controlled degree of porosity, possesses excellent wear resistance properties due to the presence of the dispersed, hard particles of nickel-titanium. Such particles are preferably introduced in the form of a pulverized intermediate alloy, as will be hereinafter explained in greater detail.

Other objects and advantages of the invention will more fully appear from the following specific description of preferred embodiments thereof, reference being made to the accompanying drawing showing a piston ring formed from a powdered ferrous metal mix containing dispersed particles of hard nickel-titanium alloy.

The piston ring 10, bearing or other part to be manufactured is formed by thoroughly mixing a pulverized, hard nickel-titanium alloy with the powdered base metal. Even relatively minute quantities of this alloy improve wear properties somewhat, and small but effective amounts to quantities as large as 60% by weight of the final mix may be used to improve the score and wear resistance of the sintered powdered material. However, in order to provide the desired economy and strength, particularly impact strength and shock resistance, the nickel-titanium content in the sintered article is preferably retained between 0.5% and 15%. Hence, an article formed from a powdered metal mix comprising approximately 0.5% to 15% by weight of the intermediate alloy of nickel and titanium and the balance substantially all iron and/or other metal provides satisfactory results. Finely divided graphite, preferably 80 mesh or finer, may be mixed with the metal powder and improves the quality of the final article if it is present in quantities not larger than about 5% by weight.

In order to obtain the desired strength and hardness of the resultant powdered metal article, approximately 0.3% to 4% graphite is preferably included in the mixture. Alternatively, the desired amount of carbon may be added, or the initial carbon content adjusted, by subsequent heat treatment, such as carburizing, of the part. It will be understood, of course, that a measurable amount of the carbon is usually lost during the sintering operation and that it is the residual carbon which is important in determining the strength of the final article. Inasmuch as sintering may reduce the initial carbon content by approximately one-third, it is desirable to control the carbon additions and sintering operation so that the residual carbon content in the article is between about 0.3% and 3.3% by weight. Thus, my preferred retained carbon content of 0.6% to 1.3% normally requires the presence of between 1% and 2% carbon before sintering.

In view of the above considerations, I have found that a sintered powdered metal article having optimum wear- and score-resistance properties in accordance with the present invention comprises approximately 2% to 7.5% by weight of the nickel-titanium alloy, 0.6% to 1.3% by weight of carbon, and the balance substantially all iron and/or other base metal. However, while the inclusion of carbon is especially desirable in powdered iron mixes, it may be omitted for some applications when certain other base metals constitute the predominant constituent in the powdered metal mix.

Likewise, to eliminate the necessity of coating the dies with a lubricant during the briquetting operation, a small but effective amount of zinc stearate powder not in excess of about 2.5% also may be beneficially included in the powdered metal mix. In general, I have found that best results are obtained with a mix having a zinc stearate content between approximately 0.3% and 2%. Of course, other die lubricants, such as stearic acid in powder form, can be employed in place of the zinc stearate. The use of such die lubricants is especially desirable in forming sintered copper base articles, for example, while it is normally not desirable to include a die lubricant in aluminum base powder mixes.

Among the pulverized nickel-titanium intermediate alloys which may be used, those containing 15% to 65% titanium and 35% to 85% nickel have resulted in the production of a sintered and forged powdered metal part having satisfactory wear resistance. For best results, however, a powdered pre-alloy containing between 50% and 75% nickel and 25% to 50% titanium should be used. Approximately −200 to −400 mesh nickel-titanium alloy powder is conveniently and preferably employed. Nickel-titanium particles which are too coarse are somewhat prone to cause scoring.

I have found that the intermediate alloy of nickel and titanium may be formed by preparing a charge of the desired percentages of titanium sponge and electrolytic nickel. Small quantities of aluminum, iron, silicon, manganeese and chromium may be alloyed with the nickel-titanium, the pre-alloy then being pulverized and added to the powdered base metal to produce especially beneficial results for particular applications. However, the silicon normally should not be present in the intermediate alloy in amounts greater than 3% by weight. The addition of aluminum appears to result in optimum properties of wear and score resistance if present in quantities ranging, in general, from about 0.3% to 15% of the pre-alloy, a 5% to 12% addition being preferred in many instances. Thus a mixture of 41% titanium sponge, 44% electrolytic nickel, 1% silicon, 11.5% aluminum and up to 3% iron produces a satisfactory nickel-titanium alloy. A small amount of chromium in the order of 0.4%, as well as manganese in quantities normally not in excess of 6%, may also be included in the intermediate alloy mix. When converted to percentages of the aforementioned final sintered alloy, the above minor constituents therefore contribute to the final alloy approximately 0.0015% to 2.25% aluminum, silicon not in excess of about 0.45%, and manganese not in excess of about 0.9%.

The nickel and iron are preferably placed in a magnesia crucible and covered. Inasmuch as titanium is a readily oxidizable element, it is desirable to use a non-oxidizing atmosphere, such as argon, as the melting atmosphere. The silicon, titanium and aluminum may then be successively added. A pouring temperature of approximately 3100° F. has proved to be satisfactory, the metal preferably being cast under the inert atmosphere as a pig in a chilled mold. Intermetallic compounds of $Ni_3Ti$, $NiTi_2$ and/or $NiTi$ are thus formed, and when pulverized and added to the base metal powder, greatly improve the wear resistance of the final sintered product. More specifically, I have found that, depending on the relative proportions of nickel and titanium present, the compounds formed include beta $Ni_3Ti$, delta $NiTi_2$, gamma $NiTi$, and eutectic mixtures of beta plus gamma and alpha plus beta compounds. Some of the titanium may also be present in the form of an alpha solid solution of titanium and nickel.

Regardless of the exact form in which some of the hard particles of nickel-titanium are present in the powdered metal, their presence greatly improves the wear and score resistance of the formed powdered metal article, provided a substantial amount of $Ni_3Ti$ particles is present. This compound is produced in sufficient quantity when the aforementioned proportions of nickel and titanium are used. If the preferred powdered pre-alloy containing 50% to 75% by weight of nickel and 25% to 50% by weight of titanium is employed, the particles will normally consist of at least 70% $Ni_3Ti$.

Ferrous metals, copper, aluminum, magnesium, nickel, zinc and lead are among the powdered base metals which may be used in practicing the present invention. Of course, various powdered alloys of these elements likewise may have their wear resistance improved by the inclusion of dispersed, hard particles of nickel-titanium. The usable powdered ferrous metals include iron, steel and alloy irons and steels. Copper base alloys, such as bronze, and aluminum base alloys containing minor amounts of other metals, such as cadmium and silicon, also may be advantageously employed, particularly in bearing applications. The size of the base metal powder particles may vary from about −50 to −325 mesh, depending on the material used and the application for which it is designed.

When ferrous base materials are used, commercial iron powders, such as those made by grinding mill scale, deoxidizing and pulverizing, provide excellent results. A steel powder, which may be produced by atomizing very hard steel, grinding and reducing the carbon content of the powder, can also be employed. Moreover, both electrolytic iron and Swedish sponge iron powders are satisfactory base materials for many powdered iron parts.

An example of an alloy steel base metal which has proved to be highly satisfactory for piston rings is 3145. This steel contains 0.43% to 0.48% carbon, 0.70% to 0.90% manganese, 0.55% to 0.75% chromium and 1.10% to 1.40% nickel. Alloy steel 5145, a related material which also produces excellent results, typically contains 0.45% carbon, 0.80% manganese, 0.80% chromium and incidental impurities. Stainless steel 302B is illustrative of another class of steels which can be advantageously used in powdered form in practicing my invention. This material consists of 0.15% maximum carbon, 17% to 19% chromium, 8% to 10% nickel, 2% to 3% silicon and the balance substantially all iron. A powdered alloy of 90% iron and 10% copper also is appropriate, as well as cast iron powders containing, for example, 3% total carbon and 2.5% silicon. Regarding proper particle sizes of ferrous base metals, −200 to −250 mesh powder has been found to be very satisfactory.

In the case of copper base articles, particularly bearings, tin and/or nickel may be beneficially included in the base material, either as separate powders or alloyed with the copper, to further increase its wear resistance and score resistance. Moreover, nickel also contributes corosion resistance to the bearing and improves its ablitity to age harden. Tin melts at a low temperature and alloys with copper to form a tin-copper alloy, the latter coating the substantially pure copper particles. During the sintering operation, the elevated temperature causes the tin to diffuse through the copper. The melting point of the metal is thus raised in the tin-rich areas, thereby providing a generally uniform alloy having a melting point above the sintering temperature. Since the tin brazes the copper particles together to form a bronze, the resultant metal is a better bearing material than if no tin were present and possesses better corrosion resistance. Furthermore, the tin and additional separately added nickel serve to strengthen the bearing.

The tin powder may be added in the form of tin dust, while the nickel may be introduced as nickel powder, such as electrolytic nickel powder or nickel produced from nickel carbonyl by means of the Mond process or other suitable means. Although nickel may also be used in other forms, it is desirable to add it in the form of nickel powder formed from nickel carbonyl as its commercially available fine particle size permits quicker homogenization. Electrolytic nickel powder, as commercially supplied, is somewhat coarser grained and its use requires a longer period of time at an elevated temperature to sufficiently homogenize the powder metal mix. Commercially pure copper, tin and nickel may be employed or a bronze powder of appropriate composition may be used instead of the mixture of these powdered elements. Hydrogen reduced copper of approximately 150 mesh has provided excellent results in bearing applications, although the particle size of the copper may vary from about 80 to 250 mesh and still produce a satisfactory product.

Examples of copper base powders which I have tested and found to be especially useful for bearing applications when the hard nickel-titanium particles are present include the following compositions: a mixture of 90% copper powder and 10% tin powder; a mixture of 90% copper powder, 5% tin powder and 5% nickel powder; a mixture of 70% copper powder and 30% nickel powder; a mixture of 80% copper powder and 20% nickel powder; and a mixture of 60% copper powder and 40% nickel powder. In each instance a bronze powder of similar composition may be employed in place of the separate powdered constituents, depending on the exact physical properties desired. Also, as hereinbefore indicated, an appropriate amount of powdered graphite can be included in any of these mixes.

Although the foregoing examples list copper contents as low as 60%, best results appear to be obtained when the copper constitutes at least 70% of the total mix. However, it will be understood that such terms as "copper base metal," "copper base powder" and "copper alloy," as used herein, are intended to encompass alloys and powdered metal mixtures in which copper is the major constituent and preferably constitutes more than 50% of the alloy or mixture.

When powdered aluminum is used as the base metal, small amounts of silicon and cadmium are preferably added to provide the bearing or other article with greater strength and wear resistance. Other elements, such as magnesium, chromium, nickel, copper, lead, bismuth, tin, indium, manganese, and a small amount of iron, likewise may be included in the mix. Of course, various incidental impurities also can be present in the usual small amounts without any substantial detrimental effects. Most of the aforementioned elements normally may be wholly or partially alloyed with the aluminum. Hence the various aluminum base bearing alloys disclosed in co-pending patent applications Serial Nos. 250,191, now Patent No. 2,766,116; 250,192, now Patent No. 2,763,546; 276,877, now Patent No. 2,807,540; 328,265, now Patent No. 2,752,239; 328,266, now Patent No. 2,752,240; 346,780, now Patent No. 2,754,202; 349,301, now Patent No. 2,770,031; and 349,302, now Patent No. 2,831,764, all in the name of Alfred W. Schluchter, may be prepared in powdered form, sintered, briquetted and have their wear resistance increased by the addition of hard nickel-titanium particles in accordance with the present invention.

The frictional properties, particularly score resistance, of the powdered aluminum base alloy may be improved by the presence of relatively small amounts of silicon, cadmium, lead or bismuth. Likewise, minor amounts of magnesium, nickel, copper and chromium may be alloyed with the aluminum to increase the hardness or hardenability of the resultant alloy. Chromium also normally confers higher strength and greater machinability to aluminum alloys and, if the alloy contains magnesium, chromium will enhance score resistance by compensating for the detrimental effects of magnesium on this property. Both chromium and silicon also tend to increase the strength of aluminum base bearing alloys. A small amount of tin is frequently useful for increasing the corrosion resistance of any lead present in the alloy used. Indium likewise may be included in small amounts in certain aluminum base alloys to improve their corrosion resistance, particularly if the alloys contain cadmium.

More specifically, excellent wear resistance and other desirable physical properties are obtained with the type of aluminum base alloy disclosed in Patent No. 2,238,399 Schluchter to which hard nickel-titanium particles have been added. Accordingly, at the present time for bearing applications I prefer to use an aluminum base powdered metal mix consisting essentially of about 2% to 10% silicon, 0.5% to 5% cadmium and the balance substantially all aluminum. These elements may be initially alloyed and subsequently pulverized to form an aluminum base alloy or they may be added to the mix as individual powdered constituents. It has been found that a powdered metal mix consisting of 94.9% aluminum, 4% silicon and 1.1% cadmium is particularly useful in combination with the hard nickel-titanium particles. Examples of other suitable aluminum base metals which can be used include a powder consisting of 92% aluminum and 8% magnesium and one of 95% aluminum and 5% lead. A highly satisfactory bearing also can be made with a base metal powder comprising 4.5% copper, 1.5% magnesium, 0.6% manganese and the balance substantially all aluminum.

Although optimum physical properties have been provided when the aluminum constitutes about 75% to 97% of the total mix, the increased wear resistance resulting from the presence of the hard nickel-titanium particles is so pronounced that a sintered powdered metal mix of even pure or commercially pure aluminum containing such particles may be used as a bearing for some applications. However, terms such as "aluminum base metal," "aluminum base powder" and "aluminum alloy" are used herein as including alloys and powdered metal mixtures in which aluminum is the major constituent and preferably constitutes more than 50% of the mixture or alloy.

Aluminum and aluminum base alloy powders of approximately —150 mesh have provided excellent results, although the particle size of this powder may vary from —60 to —325 mesh and still produce a satisfactory bearing. Other metal powders in aluminum base mixes preferably also should have particle sizes within this range.

The wear-resistant, sintered powdered metal part can be prepared by briquetting a mixture of the base metal powder or powders and the pulverized hard nickel-titanium alloy, together with zinc stearate and graphite powder, if it is desired to add the latter constituents, at an appropriate pressure in a die having a contour which is complementary to the surface to be formed. It is important to thoroughly mix the powdered metal constituents before briquetting in order to provide uniformity to the resultant structure. With most powdered ferrous base, copper base and aluminum base mixtures, a briquetting pressure between approximately 20,000 and 120,000 pounds per square inch may be used. However, a pressure of about 30,000 pounds per square inch is preferred for many powdered iron or powdered steel applications, while 40,000 to 60,000 pounds per square inch appears to be the optimum pressure range for forming copper base bearings. Higher briquetting pressures, such as those between 60,000 and 100,000 pounds per square inch, are generally preferred for aluminum.

The green briquette is then sintered under suitable conditions of time, temperature and atmosphere into a structure having a controlled degree of porosity. Sintering temperatures between 1900° F. and 2300° F. and sintering times between one-half hour and one hour have proved to be highly satisfactory for powdered ferrous base metal briquettes. Excellent results have been obtained by sintering such a briquette at 2100° F. under a non-oxidizing furnace atmosphere. At the higher sintering temperatures, when iron is present in substantial amounts in the powdered mix there may be some fusion of the nickel-titanium alloy with the iron to form a hard ternary alloy. This hard nickel-titanium-iron alloy appears to further contribute to the wear resistance of the final sintered article.

When powdered copper base articles are being formed, sintering temperatures between 1300° F. and 1950° F. and sintering times between 15 and 30 minutes are appropriate. A sintering temperature of 1500° F. for 20 minutes under a non-oxidizing furnace atmosphere is typical. On the other hand, with aluminum base briquettes sintering temperatures between 1000° F. and 1200° F. are preferred using a sintering period of 20 to 60 minutes. I have obtained excellent results with aluminum base briquettes which were sintered at about 1150° F. for approximately 30 minutes. With some non-ferrous base powders, such as lead base alloys, for example, the sintering temperature may be as low as about 500° F. The above sintering periods also are not critical, and sintering times as short as four minutes and as long as 30 minutes are satisfactory for various applications.

Among the non-oxidizing furnace atmospheres which may be employed, dry "Drycolene" gas or a gaseous mixture of "Neutralene" and a small amount of natural gas is satisfactory. For some non-ferrous base powders, such as copper or bronze powders, a dissociated ammonia atmosphere is particularly effective. The dry Drycolene gas normally is composed of approximately 20% carbon monoxide, 3% hydrogen and 77% nitrogen. The Neutralene atmosphere is a closely related gaseous mixture which usually consists of approximately 1.5% carbon monoxide, 1.5% hydrogen and 97% nitrogen. It has proved advantageous to mix about 100 parts of Neutralene with one part of natural gas. Of course, other furnace atmospheres, such as hydrogen, mixtures of nitrogen or hydrogen and methane, etc., can be used, but Drycolene and Neutralene are readily available and each provides a highly effective protective atmosphere. Gases with high hydrogen contents have a greater tendency to decarburize the briquette and are therefore generally less desirable.

For some purposes the sintered briquette has satisfactory properties without subsequent working. However, the density and strength of the formed sintered powdered metal part may be increased by hot or cold working, including forging and multiple pressing operations. The forging operation is normally one of hot forging, and usually it is expedient to forge the briquette before it has cooled after the sintering step. If desired, the sintered briquette may be permitted to cool and then be reheated to a temperature appropriate for forging. Forging temperatures approaching those used for sintering are generally suitable for use in the present invention. Alternatively, desirable physical properties may be obtained, particularly with sintered ferrous base articles, by multiple cold pressing of the briquette. The forging or pressing operations, whether hot or cold, increase the tensile strength of the sintered material, especially as the porosity approaches zero. Inasmuch as a very dense structure may permit scoring under severe operating conditions, it is desirable to carefully control the forging so as to provide the formed part with proper porosity. More specifically, therefore, I have usually found it advisable to control forging so as to form a powdered metal article having between approximately 2% and 13% porosity, thereby improving resistance to score.

Following the forging or pressing operation, whichever is employed, the sintered blank may be subjected to an appropriate heat treatment. In the case of a ferrous base metal part, for example, tempering for approximately 30 to 60 minutes at a temperature between about 800° F. and 1100° F. reduces stresses introduced by cold pressing and tempers the martensite formed during rapid cooling after forging. If hot forging has been employed, cooling is preferably accomplished in a die or between plates. In the case of a ferrous base article, the finished product may be advantageously surface treated with a phosphate type of anti-friction material, such as iron-manganese-phosphate. Other appropriate surface treatments can be used, of course.

If an appreciable amount of nickel has been separately included in a powder copper base metal mix, heat treatment subsequent to sintering is particularly beneficial. Thus a solution treatment for one to eight hours in a non-oxidizing atmosphere at a temperature between approximately 600° F. and 1400° F. may be used to provide greater hardness and homogeneity. A two-step process is preferably employed, however, such as an initial heat treatment for five hours in a non-oxidizing atmosphere at 1400° F. followed by a water or oil quench and a low-temperature heat treatment or aging in a similar atmosphere for five hours at 600° F. The copper base article may also be beneficially aged at room temperature following the solution step.

Likewise, both the strength and fatigue resistance of sintered articles formed of aluminum base powder frequently can be improved by suitable heat treatment. For example, a solution treatment at a temperature of about 900° F. to 1050° F. for a period of about 8 to 15 hours is effective. Upon removing the sintered bearing or other article from the furnace following the solution treatment, it is preferable to cool it immediately by quenching in water. This treatment appears to increase the ductility of the formed part. A precipitation treatment may thereafter be employed to substantially increase the hardness of the aluminum base article. This process is preferably carried out by heating the article for 5 to 10 hours at a temperature of approximately 300° F. to 400° F., a precipitation treatment at 370° F. for eight hours being particularly satisfactory. The bearing or other part then may be again cooled, preferably in water.

It will be understood that a sintered powdered metal article containing dispersed particles of hard nickel-titanium particles in accordance with this invention may be manufactured under the usual porous metal techniques as disclosed in a number of patents, such as Patents Nos. 1,738,163, 2,097,671, 2,075,444, etc. Also, instead of briquetting the metal powder as hereinbefore explained, it may be molded to shape prior to sintering as suggested in Koehring Patent No. 2,198,702.

Likewise, the powdered metal mix may be merely spread on or otherwise placed in contact with a supporting surface and subsequently sintered. This supporting surface may be a non-porous metal backing strip, such as a steel strip, and the powdered metal may be bonded to the back on sintering. When this latter procedure is used, it may be desirable to first electrodeposit a suitable metal plate on the surface of the back to improve the strength of the bond. This type of process is disclosed in Koehring Patents Nos. 2,187,086 and 2,198,253. After sintering, the composite of spongy powdered metal on the back may be rolled to increase the density of the powdered metal article and then resintered or annealed. Additional rolling and annealing treatments can be employed to further increase the density of the formed article. In this manner a highly wear-resistant sintered powdered metal layer may be formed on a steel back.

All of the above modifications are understood to be within the scope of the present invention, which broadly comprehends the provision of a sintered powdered metal part containing dispersed, hard particles of nickel-titanium alloy.

Wear and score tests were conducted to compare sintered and forged powdered metals formed in accordance with my invention with the same materials devoid of hard nickel-titanium particles. In the case of sintered powdered iron base materials, for example, each specimen to be tested was machined to prepare a ⅛ inch by 1⅛ inch rubbing surface. The specimens were next successively locked in a fixture of the wear test machine and placed in contact with a rotating smooth-surfaced cast iron wheel having a face width of one inch. Increased wear resistance was measured by decreased weight loss in grams and in decreased volume loss in cubic inches, while score resistance was indicated by the load required to cause scoring under prescribed test conditions.

A wear test using this apparatus was conducted in which the specimen load was increased during the 18½ hour period from zero load and automatically adjusted to produce a constant frictional load of 64 pounds. At the end of this test period sintered and forged specimens formed from a conventional mixture of powdered iron and approximately 2% graphite showed an average weight loss of 0.028 gram. On the other hand, sintered powdered metal specimens of similar composition but containing the aforementioned preferred amounts of hard nickel-titanium particles lost an average of only approximately 0.0011 gram. Likewise, while the conventional sintered and forged powdered iron samples underwent a volume loss averaging about $238 \times 10^{-6}$ cubic inches, the specimens formed in accordance with the present invention changed on the average only $-8 \times 10^{-6}$ cubic inches. The results of this test show how greatly the presence of dispersed, hard particles of nickel-titanium alloy increases the wear resistance of sintered powdered metal articles.

Tests also indicate that these hard particles appreciably increase the anti-friction properties of sintered powdered metals. This property was measured by means of the specimen load required to produce a 64 pound frictional load. Samples formed of sintered powdered iron containing the aforementioned nickel-titanium particles required an average of about 900 pounds specimen load to produce the 64 pound frictional load as compared with an average of only approximately 568 pounds specimen load when the samples without these particles were tested, thus indicating that the coefficient of friction of such a material is substantially reduced by the presence of the nickel-titanium alloy particles.

The aforementioned specimens were also subjected to a score test in which the test samples were placed against the aforementioned rotating wheel for 60 minutes under a 502 pound specimen load, and this load was then increased until scoring occurred. The ordinary sintered powdered iron specimens scored under the 502 pound load, but an average load of approximately 945 pounds was required to cause any indication of scoring of the sintered powdered iron containing the hard nickel-titanium alloy particles. Hence, the results of this test indicate that the presence of these hard particles also improves the score resistance of sintered powdered metals.

It was also desirable, particularly with regard to piston ring applications, to compare the iron base specimens containing nickel-titanium particles with conventional cast iron piston ring materials. In the above-described wear test an average specimen load of only about 650 pounds was required to produce the 64 pound frictional load when the cast iron samples were tested. At the end of the test these samples showed an average weight loss of approximately 0.016 gram and a volume loss averaging about $140 \times 10^{-6}$ cubic inches. Likewise, in the aforementioned score test, the cast iron piston ring material required an average specimen load of only 760 pounds to produce scoring. These results show that sintered powdered iron containing hard nickel-titanium particles has appreciably better anti-friction properties and wear resistance than conventional cast iron.

A comparison of the results of actual engine tests on conventional cast iron piston rings with piston rings formed from sintered iron containing the aforementioned percentages of nickel-titanium alloy and graphite shows that top compression rings formed of the former material had 2 to 3 times the weight loss of top compression rings of sintered powdered iron containing the nickel-titanium particles. The results of these engine tests likewise indicate the same superiority of the sintered powdered iron rings during a mechanical wear test period equivalent to driving an automobile at 60 miles per hour for 36,500 miles after the initial break-in period and during a corrosive mechanical wear test with a cold engine at 60 miles per hour for approximately 5,000 miles.

Favorable results were likewise obtained by the inclusion of hard nickel-titanium alloy particles in other sintered powdered metals, such as sintered powdered copper base and aluminum base alloys. In the case of sintered powdered bronze, the samples were prepared as tensile bars briquetted at a pressure of 60,000 pounds per square inch. They were then sintered for 25 minutes in a dried Drycolene atmosphere at a temperature of 1525° F. and subsequently cooled in this atmosphere. None of the samples were forged. As before, each specimen to be tested was machined to prepare a ⅛ inch by 1⅛ inch rubbing surface and the specimens successively subjected to the aforementioned wear test.

A modified wear test using the above-described apparatus was conducted in which the specimen load was increased to 512 pounds and retained at this figure for a total test period of five hours. At the end of this time the sintered copper base test specimens which did not contain nickel-titanium particles lost an average of 0.341 gram, while the copper base samples of similar composition but containing the hard nickel-titanium alloy particles showed an average weight reduction of only 0.005 gram. Also, while the latter specimens underwent a volume loss averaging only $5 \times 10^{-5}$ cubic inches, the average volume of the test specimens not containing nickel-titanium particles was reduced on the average about $269 \times 10^{-5}$ cubic inches.

When similar wear tests were conducted on sintered powdered commercially pure aluminum and aluminum alloys, highly satisfactory results were also obtained. A five hour test period was again used, but the specimen load was raised to only 251 pounds. Typical of the results were those obtained from testing specimens formed of a sintered powdered alloy consisting essentially of about 4% silicon, 1.1% cadmium and the balance aluminum. These specimens lost an average of 0.2255 gram in the wear test and their volumes were reduced an average of approximately $5210 \times 10^{-6}$ cubic inches. On the other hand, when the nickel-titanium alloy particles were added to this mix in amounts of 2% to 5%, the average weight loss of these specimens during the wear test was only about 0.0170 gram and the volume loss approximately $206 \times 10^{-6}$ cubic inches.

While the present invention has been described by means of certain specific examples, it is to be understood that the scope of the invention is not to be limited thereby except as defined in the following claims.

I claim:

1. A sintered and worked powdered metal consisting essentially of approximately 0.5% to 15% of a nickel-titanium alloy in which nickel and titanium constitute approximately 35% to 85% and 15% to 65%, respectively, and the balance substantially all a metal selected from a class consisting of ferrous base metals, copper, copper base alloys, aluminum and aluminum base alloys.

2. A highly wear-resistant sintered powdered metal consisting essentially of a minor proportion of a nickel-titanium alloy in the form of dispersed hard particles in which nickel and titanium constitute approximately 50% to 75% and 25% to 50%, respectively, and the balance substantially all a metal selected from the class consisting of ferrous base metals, copper, copper base alloys, aluminum and aluminum base alloys.

3. A highly wear-resistant sintered metal article formed from a mixture comprising 2% to 7.5% powdered nickel-titanium alloy and the balance substantially all at least one metal powder selected from the class consisting of ferrous base metals, copper, copper base alloys, aluminum and aluminum base alloys, said nickel-titanium alloy containing about 50% to 75% nickel and 25% to 50% titanium.

4. A highly wear-resistant sintered and worked metal article formed from a mixture consisting essentially of 2% to 7.5% powdered nickel-titanium alloy in which a substantial amount of the intermetallic compound Ni₃Ti is present, carbon not in excess of 3.3%, and the balance substantially all a metal powder selected from the class consisting of ferrous base metals, copper, copper base alloys, aluminum and aluminum base alloys, said nickel-titanium alloy consisting principally of about 50% to 75% nickel and 25% to 50% titanium.

5. A highly wear-resistant sintered powdered metal comprising approximately 0.3% to 3.3% carbon, 0.5% to 15% dispersed hard particles of nickel-titanium alloy, and the balance substantially all a ferrous base metal, said intermediate alloy consisting principally of 35% to 85% nickel and 15% to 65% titanium.

6. A highly wear-resistant sintered powdered metal piston ring comprising approximately 0.3% to 3.3% carbon, 2% to 7.5% of nickel-titanium alloy in the form of hard particles generally uniformly dispersed throughout said piston ring, and the balance substantially all powdered iron, said intermediate alloy containing 50% to 75% nickel, 25% to 50% titanium, 0.3% to 15% aluminum and silicon not in excess of 3%.

7. A porous piston ring characterized by high score and wear resistance, said piston ring being formed of a sintered and worked mixture consisting essentially of approximately 2% to 7.5% of powdered nickel-titanium alloy principally in the form of hard particles of intermetallic compounds of nickel and titanium, and the balance substantially all a ferrous base metal powder, said nickel-titanium alloy comprising about 50% to 75% nickel and 25% to 50% titanium.

8. A porous piston ring formed from a powdered ferrous base metal mix containing approximately 0.5% to 15% of a nickel-titanium alloy principally in the form of hard particles dispersed throughout said mix and in which titanium constitutes between 15% and 65% of the nickel-titanium alloy.

9. A wear-resistant sintered powdered copper base bearing formed from a mixture comprising 0.5% to 15% powdered nickel-titanium alloy principally in the form of hard particles of intermetallic compounds of nickel-titanium and the balance substantially all copper base powder, said nickel-titanium alloy consisting essentially of 35% to 85% nickel and 15% to 65% titanium.

10. A sintered powdered copper base bearing characterized by outstanding wear resistance and high strength, said bearing consisting essentially of about 0.3% to 3.3% carbon, 2% to 7.5% nickel-titanium alloy of which nickel constitutes between 50% and 75% and titanium constitutes between 25% and 50%, and the balance principally copper base alloy.

11. A highly wear-resistant sintered powdered aluminum base bearing formed from a mixture comprising 0.5% to 15% dispersed hard particles of nickel-titanium alloy in which nickel and titanium constitute approximately 35% to 85% and 15% to 65%, respectively, and the balance substantially all aluminum base powder.

12. A highly wear-resistant sintered and worked aluminum base bearing formed from a powdered mixture consisting essentially of 2% to 7.5% nickel-titanium alloy in which a substantial amount of the intermetallic compound Ni₃Ti is present, silicon not in excess of 10%, cadmium not in excess of 5%, and the balance substantially all aluminum, said nickel-titanium alloy consisting principally of about 50% to 75% nickel and 25% to 50% titanium.

13. A process for forming a highly wear-resistant sintered powdered metal part which comprises briquetting a mixture of 2% to 7.5% of a nickel-titanium alloy powder in which nickel and titanium respectively constitute approximately 35% to 85% and 15% to 65%, 1% to 2% graphite powder, and the balance substantially all a ferrous base metal powder, sintering the formed briquette, and thereafter working said briquette to obtain optimum strength and porosity.

14. A method of forming a sintered powdered metal part which comprises briquetting a powdered copper base metal mixture containing 0.3% to 4% graphite and 0.5% to 15% of an intermediate nickel-titanium alloy comprising 35% to 85% nickel and 15% to 65% titanium, sintering the formed briquette, and thereafter working said briquette to a porosity between 2% and 13%.

15. A process of forming a sintered powdered metal article characterized by high score and wear resistance, said process including thoroughly mixing a powder comprising approximately 0.5% to 15% of a pulverized intermediate alloy consisting primarily of nickel and titanium in which the titanium constitutes between 25% and 50% of the intermediate alloy, and the balance substantially all a metal powder selected from a class consisting of ferrous base metals, copper, copper base alloys, aluminum and aluminum base alloys; compressing said powder into a briquette; subsequently sintering said briquette; and thereafter working said briquette to provide it with optimum strength and porosity.

16. The process of forming a bearing characterized by high score and wear resistance, said process comprising compressing a powdered aluminum base metal mixture into the shape of a bearing blank, said mixture containing approximately 0.3% to 4% graphite and 2% to 7.5% of a pulverized intermediate alloy consisting primarily of nickel and titanium in which the nickel and titanium respectively constitute 35% to 85% and 15% to 65% of the intermediate alloy, subsequently sintering said blank, and thereafter working said blank to provide it with optimum strength and porosity.

17. A process of forming a porous piston ring which comprises mixing a pulverized nickel-titanium alloy with iron powder in an amount to produce a piston ring containing 0.5% to 15% nickel-titanium alloy having a nickel content of about 50% to 75% and a titanium content of 25% to 50%, briquetting the resultant mix at a pressure between 20,000 pounds per square inch and 120,000 pounds per square inch into an annular form, sintering the formed briquette under a non-oxidizing atmosphere for a period of time ranging from 4 minutes to 90 minutes at a temperature between approximately 1900° F. to 2300° F., subsequently forging said sintered briquette in a contour-shaped ring die to a porosity between 2% to 13%, die cooling the formed piston ring blank, and thereafter tempering said blank for approximately 30 to 60 minutes at a temperature between 800° F. and 1100° F.

18. A process of forming a sintered powdered metal bearing characterized by high wear resistance and good frictional properties, said process comprising forming a powdered mixture of approximately 0.3% to 6.5% graphite, 0.5% to 15% nickel-titanium alloy containing 35% to 85% nickel and 15% to 65% titanium, and the balance substantially all copper base alloy, forming said mixture into the shape of a bearing blank, thereafter sintering said bearing blank under a non-oxidizing atmosphere at a temperature between approximately 1300° F. and 1950° F., subsequently rolling said blank to increase its density, and finally annealing the rolled blank.

References Cited in the file of this patent

UNITED STATES PATENTS

| | | |
|---|---|---|
| 2,206,395 | Gertler | July 20, 1940 |
| 2,219,095 | Schluttler | Oct. 22, 1940 |
| 2,694,790 | Studders | Nov. 16, 1954 |
| 2,741,827 | Koehler | Apr. 17, 1956 |
| 2,763,519 | Thompson | Sept. 18, 1956 |